March 25, 1930.  R. B. GUILBAULT  1,751,811
SPLICING MOLD
Filed June 2, 1928
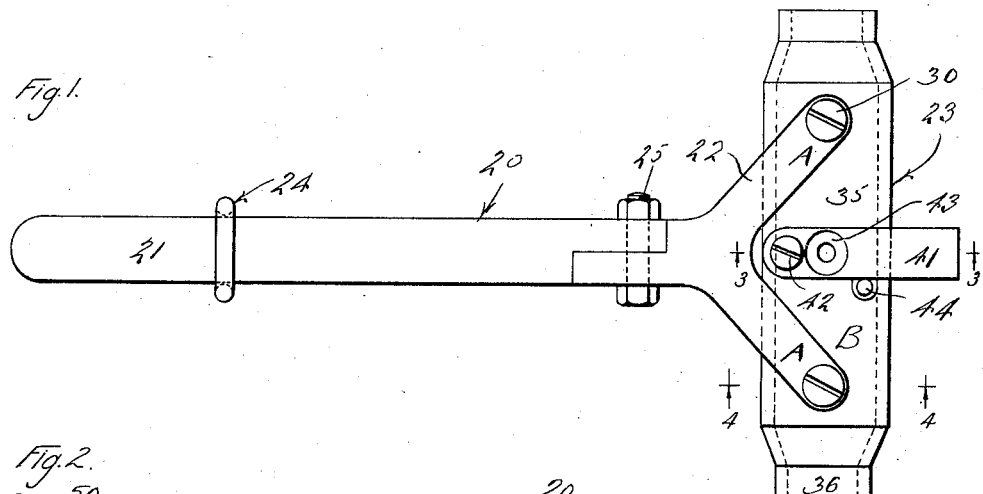
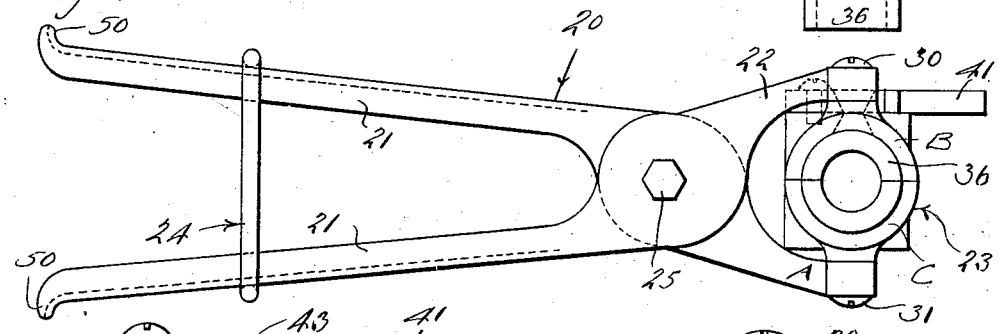
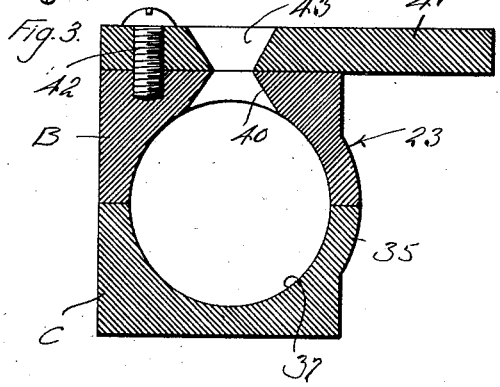
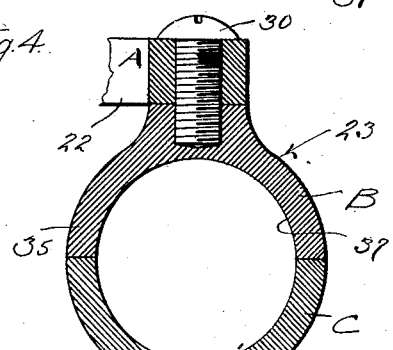
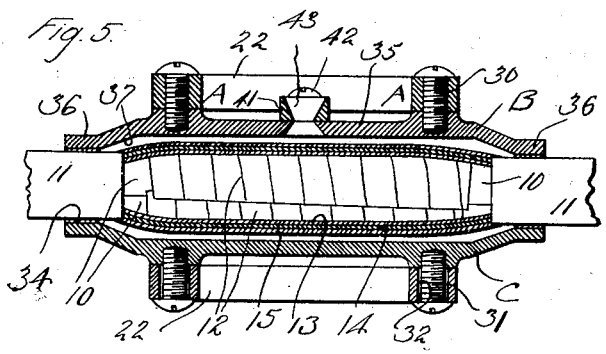
Inventor
Russell B. Guilbault.
by
his Attorney Patented Mar. 25, 1930

1,751,811

UNITED STATES PATENT OFFICE

RUSSELL B. GUILBAULT, OF CULVER CITY, CALIFORNIA

SPLICING MOLD

Application filed June 2, 1928. Serial No. 282,316.

This invention has to do with a splicing mold, it being a general object of the invention to provide a device for use in splicing or connecting lead cable coverings, or the like.

Lead covered cables, for instance lead covered electrical conductors, are used extensively and in practice when it is necessary to join such cables the conductors or wires in the cables are connected, for example wrapped and soldered together, then the several wire connections are insulated from one another by means of suitable insulating tape, or the like, and then the lead coverings of the two cables are connected and the insulated wire connections are sealed by forming a lead or solder joint between the lead coverings of the cables. The joints or connections made between the lead coverings are known as "wiped joints" such as are used in connecting lead pipes and the like and their formation requires considerable time on the part of highly skilled workmen.

It is a general object of this invention to furnish a device whereby the necessary connection can be made between the lead coverings of adjoining cables or like lead members without forming the usual wiped joint.

It is a further object of this invention to provide a simple, effective and easily handled mold for casting a body of metal to join the lead coverings of adjoining cables, or the like.

It is another object of this invention to supply a device of the character mentioned which permits of a practical and dependable connection being made easily and quickly by ordinary workmen.

A further object of the invention is to provide a mold of the character mentioned which operates to form the desired casting without the cast metal adhering to the mold.

The various objects and features of my invention will be best and more fully understood from the following detailed description of a typical form and application of the invention, throughout which description I refer to the accompanying drawings, in which:

Fig. 1 is a top view or plan elevation of the device provided by this invention. Fig. 2 is a side view of the device. Fig. 3 is an enlarged detailed sectional view of the device taken as indicated by line 3—3 on Fig. 1. Fig. 4 is an enlarged detailed sectional view of the device taken as indicated by line 4—4 on Fig. 1, and Fig. 5 is a longitudinal sectional view showing the device in operating position in connection with the joined or spliced ends of two cables.

The device or tool provided by this invention is useful, generally, in casting or forming metal around and between adjacent parts such, for example, as lead cable coverings, or the like. The device can be made for use at connections between two or more such parts and at connections where the parts join at various angles. For purpose of example I will refer to the invention as applied to a splice or connection between two lead covered cables, arranged end to end, and in the drawings I have disclosed two lead covered cables and have shown the strands or wires 10 of the cables projecting beyond the ends of the lead coverings 11 and joined together, the joints or splices being wrapped with insulating material 12, and the group or bundle or splices being covered with insulating material, for instance, with a layer of rubber tape 13 and then a layer of fabric or friction tape 14. I have made reference to this particular form of splice or wire connection merely for the purpose of showing one typical situation in which the invention can be used, it being understood that the invention is concerned primarily with the connection to be made between the lead coverings 11, and is not limited in any way to the matter that may be in or located between the ends of the coverings 11. In preparing a splice or connection such as I have above described for my casting device, a body or layer of heat insulating material 15, say for instance a layer of asbestos, is preferably applied over the insulation of the splice to protect the insulation against heat.

The casting tool provided by this invention includes, generally, a pair of levers 20, arranged in cross relation and pivotally connected at the point at which they cross so that they have outer ends forming handles 21 and inner ends forming jaws 22. A mold 23 is carried by the jaws of the levers and is adapted to engage the adjoining end portions of the coverings 11. Locking means 24 is provided in connection with the handles of the levers so that the levers can be set to hold the mold in set or fixed position during operation.

The levers 20 are pivotally connected together by a suitable pivot pin 25 as shown in the drawings. The outer or handle ends 21 of the levers are shaped and proportioned so that they can be conveniently gripped by an operator in the course of handing the tool and so that the operator has a suitable amount of leverage over the mold 23 carried by the jaws 22 allowing the mold to be clamped in place with suitable force or pressure. The inner or jaw ends 22 of the levers are yoked to have spaced arms A which operate to engage opposite end portions of the mold 23, as clearly illustrated in Fig. 1 of the drawings.

The mold 23 is a tubular mold split longitudinally into two sections B and C to facilitate its being arranged in operating position as shown in Fig. 5. The mold section B is carried by the arms A of one lever, while the mold section C is carried by the arms of the other lever.

Various constructions may be employed in connecting the mold sections with the arms of the levers. In accordance with the preferred form of my invention, one of the mold sections is rigidly carried by the arms of its supporting lever while the other is more or less loosely carried so that it is free to center or accommodate itself to the lead coverings 11 and the first-mentioned mold section, as the device is arranged in place. In the drawings I have shown the mold section B rigidly carried by the arms A of one lever by means of screws 30, and have shown the mold section C more or less loosely connected with the arms B of the other lever by screws 31. The desired looseness between the mold section C and its supporting arms may be furnished by making the openings 32 in the arms large enough to pass the screws 31 with clearance, as clearly illustrated in Fig. 4 of the drawings. Further, in this case the screws can be applied so that they do not clamp the said arms A tightly to the mold section C.

The middle or body 35 of the mold is sufficiently large to fit over spliced conductors 10, or the like, such as may occur between the ends of the lead coverings 11, with clearance so that material cast into the mold when in place, as shown in Fig. 5, will completely cover the splice. The end portions 36 of the mold are of reduced diameter, it being preferred to make them to more or less accurately fit the lead coverings 11 in connection with which the tool is to be used. In practice, however, variations in size between the ends 36 of the mold and the lead coverings 11 may be compensated for by applying a filler of tape 34, or the like, between the coverings 11 and the mold as illustrated in Fig. 5. The filling 34 is used so that molten material will not escape from the ends of the mold as it is cast.

In accordance with my invention, I form the mold sections B and C of cast iron and coat their inner surfaces 37 with aluminum. In practice any suitable means may be used in applying the aluminum to the cast iron. I have found that the combination of metals just referred to is of importance as the cast iron has a specific heat suitable for this use while the aluminum coating on the face of the mold prevents solder, or the like, used in the casting, from sticking in the mold. In practice I have found it advantageous to cast solder as this material gives a very satisfactory joint, frees itself of the mold, and forms a proper bond with the lead coverings 11 ordinarily employed on cables and the like.

A gate or filling opening 40 is provided in the top of the upper mold section B to admit molten material into the mold and a pouring guide 41 is pivotally mounted on the top of the section B to be arranged in register with the opening 40 during the pouring operation and to be swung about its mounting pin 42 to cut off the projecting button of metal that may be left at the gate 40 after the casting operation. The pouring guide may be a metal bar pivotally mounted by means of pin 42 and have an opening 43 to register with the gate of the mold as shown in Figs. 3 and 5 of the drawings. A suitable pin 44 may be provided on the top of the section B for stopping the pouring guide in proper operating position as shown in Fig. 1.

The locking means 24 is preferably arranged in connection with the handles 21 of the levers. In the form of the invention illustrated in the drawings the locking means is in the form of a ring or link applied around the handles and adapted to be moved outwardly on the handles as the handles are moved together, as will appear from Fig. 2 of the drawings. The handles are proportioned so that they diverge somewhat from the point of pivotal connection of the levers so that they properly cooperate with the locking ring. In practice lugs or projections 50 are provided on the outer ends of the handles 21 to positively prevent displacement of the locking ring from the ends of the handles.

In using the device the lead members or cable coverings 11 are properly cleaned and any splices, or the like, that may occur between the ends of the coverings are prepared to receive a casting of solder, or the like. The device is applied by opening or separating the mold sections and passing them over the adjoining ends of the coverings 11 and then bringing them together as shown throughout the drawings. The handles 21 are operated so that the mold sections are clamped tightly in place and the locking ring is set on the handles to hold the tool in this position. If the contracted end portions of the mold 23 do not closely fit the coverings 11, fillers 34 are used as above described. The molten metal, for instance solder, is then poured through the guide 41 and gate 40 into the mold so that it is cast around the end portions of the lead coverings 11 and around the splice occurring between the coverings. When the casting has been made, the pouring guide is operated, for instance hammered, to swing about its pivotal pin 42, cutting the button of metal that may be left in the guide and thus freeing the mold in order that the locking ring 24 can be released and the mold sections separated for removal from the casting. In practice, the mold is preferably preheated before being arranged in place as above described.

The casting which is made in the device provides a tight, secure joint between the lead coverings 11 and is equal, if not superior, to the usual form of wipe joint now used in this class of work. It will be obvious that the device can be easily and quickly operated and that it does not require a high degree of skill as does the making of a wipe joint.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A device of the character described including, a tubular mold divided longitudinally into two sections having inner walls substantially parallel to its axis and having end portions of reduced diameter, and a pair of pivotally connected levers, each lever having a jaw carrying a mold section.

2. A device of the character described including, a tubular mold divided longitudinally into two sections and having end portions of reduced diameter, the entire inner walls of the sections between the reduced end portions being substantially parallel to the axis of the mold, and a pair of pivotally connected levers, each lever having a jaw carrying a mold section, one section of the mold having a gate intermediate its ends.

In witness that I claim the foregoing I have hereunto subscribed my name this 24th day of May, 1928.

RUSSELL B. GUILBAULT.